United States Patent
Johnsen et al.

(10) Patent No.: US 6,761,594 B2
(45) Date of Patent: Jul. 13, 2004

(54) DSX JACK INCLUDING SLIDING REAR CONNECTOR

(75) Inventors: David J. Johnsen, New Hope, MN (US); Scott K. Baker, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/374,637

(22) Filed: Feb. 25, 2003

(65) Prior Publication Data

US 2003/0134541 A1 Jul. 17, 2003

Related U.S. Application Data

(63) Continuation of application No. 09/835,067, filed on Apr. 13, 2001, now Pat. No. 6,533,616.

(51) Int. Cl.[7] .............................................. H01R 24/04
(52) U.S. Cl. ...................................... 439/668; 439/669

(56) References Cited

U.S. PATENT DOCUMENTS

| | | | |
|---|---|---|---|
| 3,332,053 A | 7/1967 | Busler | 439/596 |
| 4,588,251 A | 5/1986 | Newton | 439/638 |
| 4,712,232 A * | 12/1987 | Rodgers | 379/329 |
| 5,129,842 A * | 7/1992 | Morgan et al. | 439/532 |
| 5,233,501 A | 8/1993 | Allen et al. | 361/733 |
| 5,413,494 A | 5/1995 | Dewey et al. | 439/188 |
| 5,497,444 A | 3/1996 | Wheeler | 385/135 |
| 5,582,525 A | 12/1996 | Louwagie et al. | 439/668 |
| 5,647,763 A * | 7/1997 | Arnold et al. | 439/540.1 |
| 5,746,617 A | 5/1998 | Porter, Jr. et al. | 439/248 |
| 5,885,112 A | 3/1999 | Louwagie et al. | 439/719 |
| 5,913,701 A | 6/1999 | Olson et al. | 439/668 |
| 5,938,478 A | 8/1999 | Werner | 439/668 |
| 6,116,961 A | 9/2000 | Henneberger et al. | 439/668 |
| 6,283,796 B1 * | 9/2001 | Yeh | 439/677 |
| 6,497,586 B1 * | 12/2002 | Wilson | 439/532 |
| 6,547,588 B1 * | 4/2003 | Hsu et al. | 439/535 |

FOREIGN PATENT DOCUMENTS

| | | |
|---|---|---|
| FR | 931 803 | 3/1948 |
| GB | 1 394 867 | 5/1975 |

* cited by examiner

*Primary Examiner*—Hae Moon Hyeon
(74) *Attorney, Agent, or Firm*—Merchant & Gould P.C.

(57) ABSTRACT

A connector assembly and method, the assembly having a housing which defines a connector window. A connector is disposed within the window. The connector is slidable between a first and second position relative to the housing. The assembly may include a carriage for receiving one or more connectors. The carriage slides with the connectors between first and second positions. The assembly may include means for retaining the carriage and connectors in a selected position relative to the housing.

25 Claims, 11 Drawing Sheets

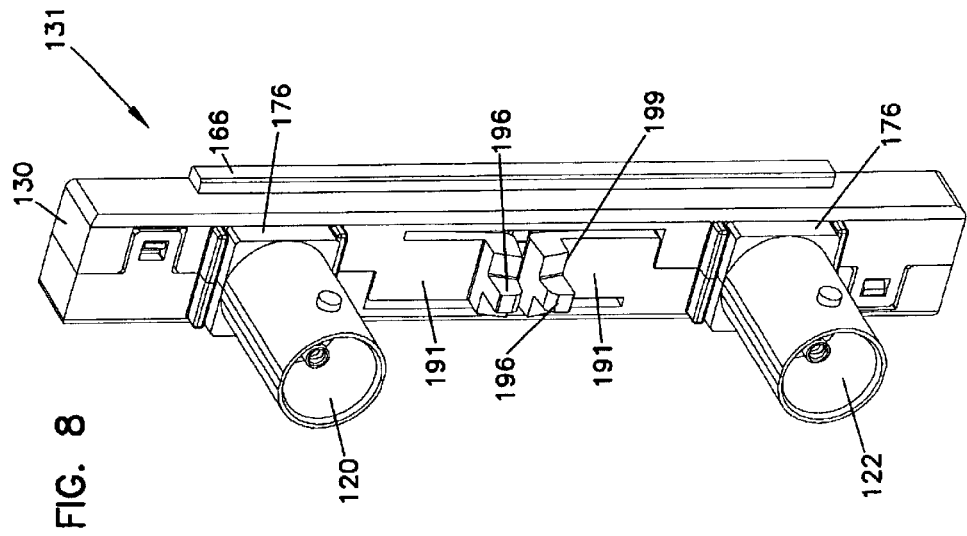
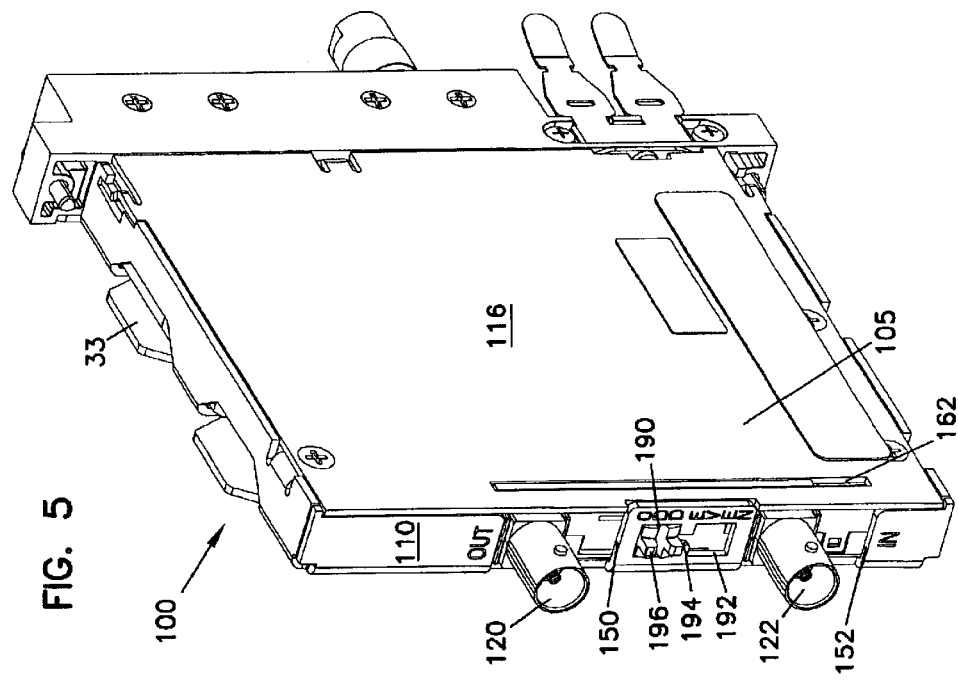

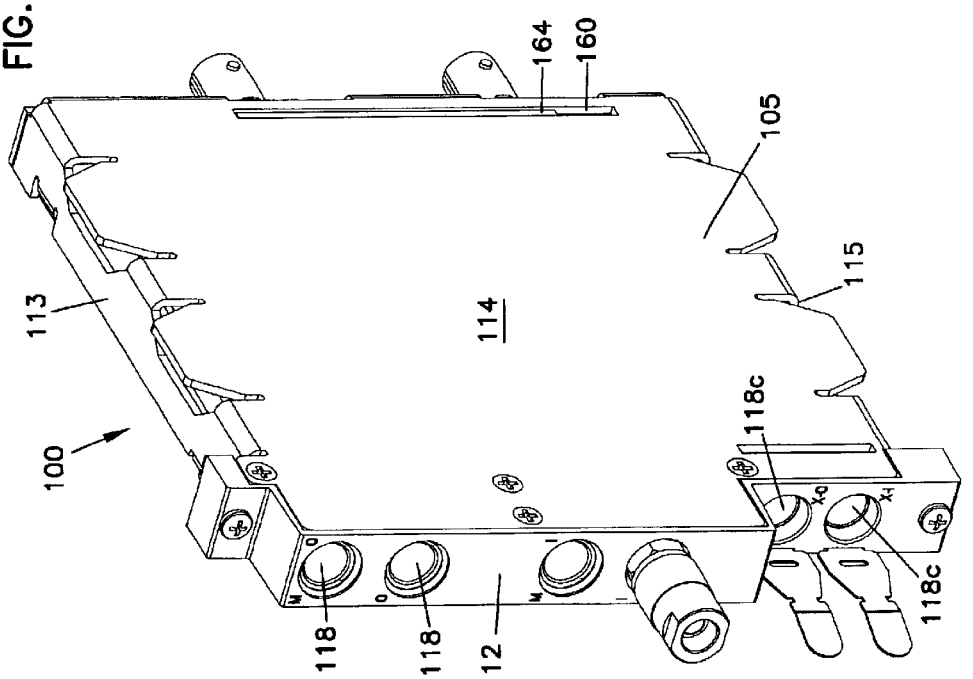
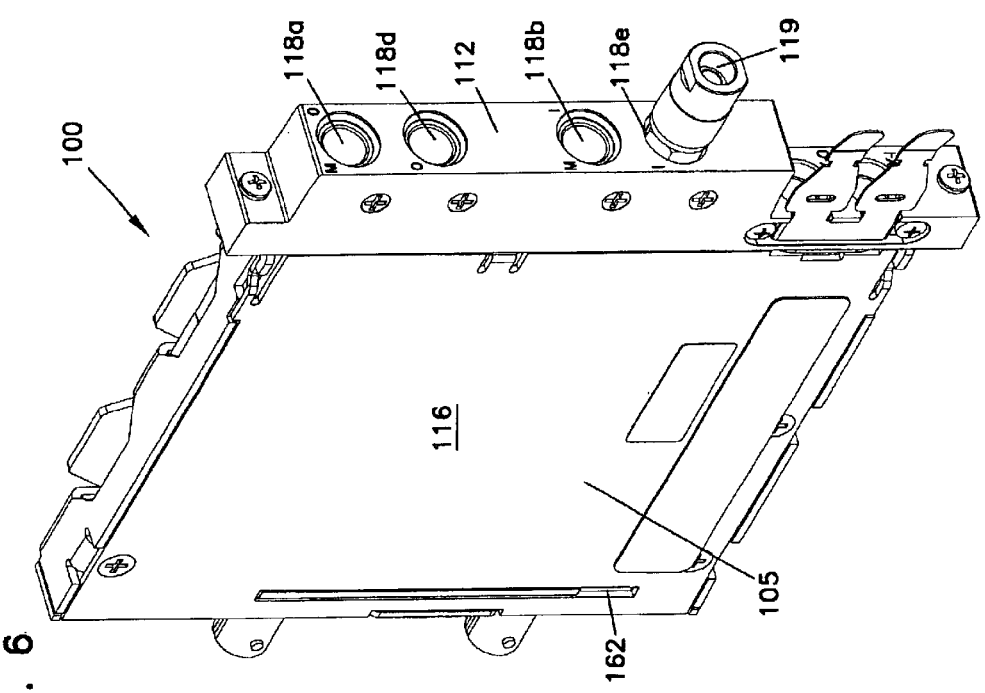

FIG.10
FIG.11
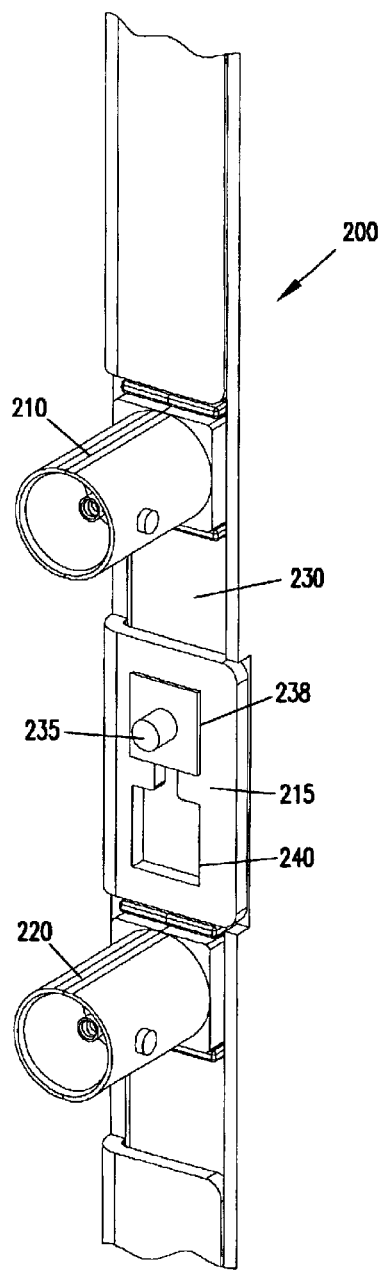
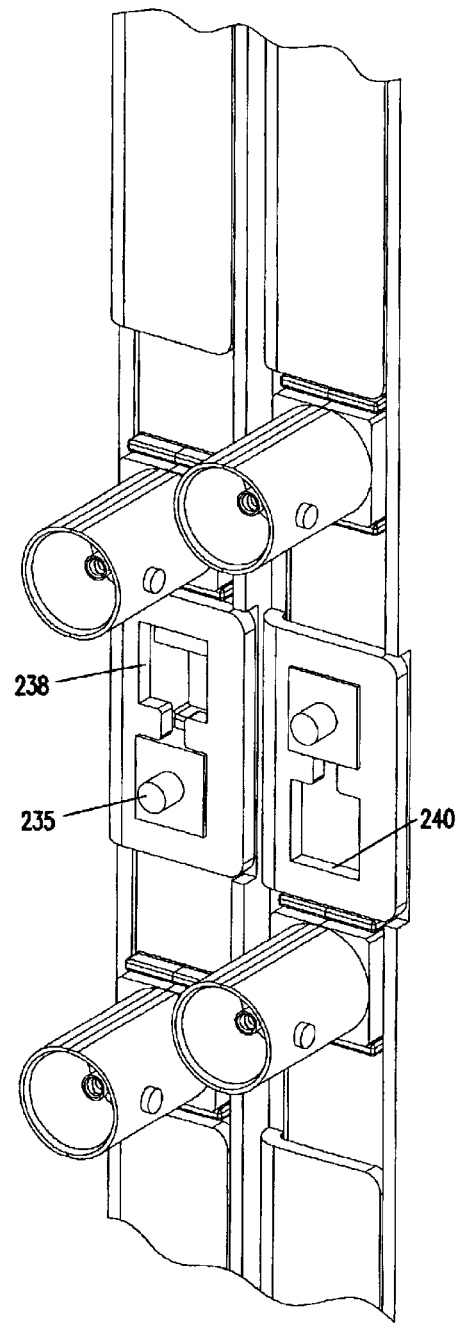

FIG. 12
FIG. 13
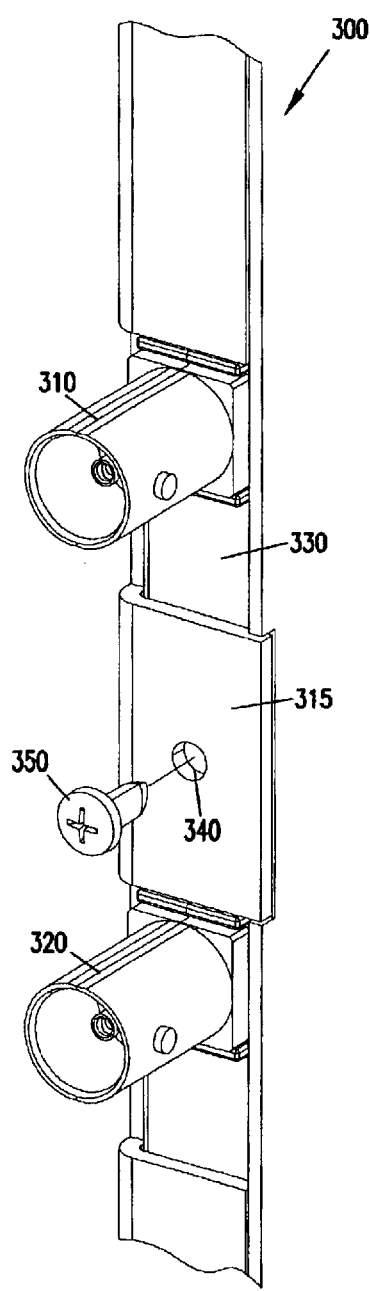
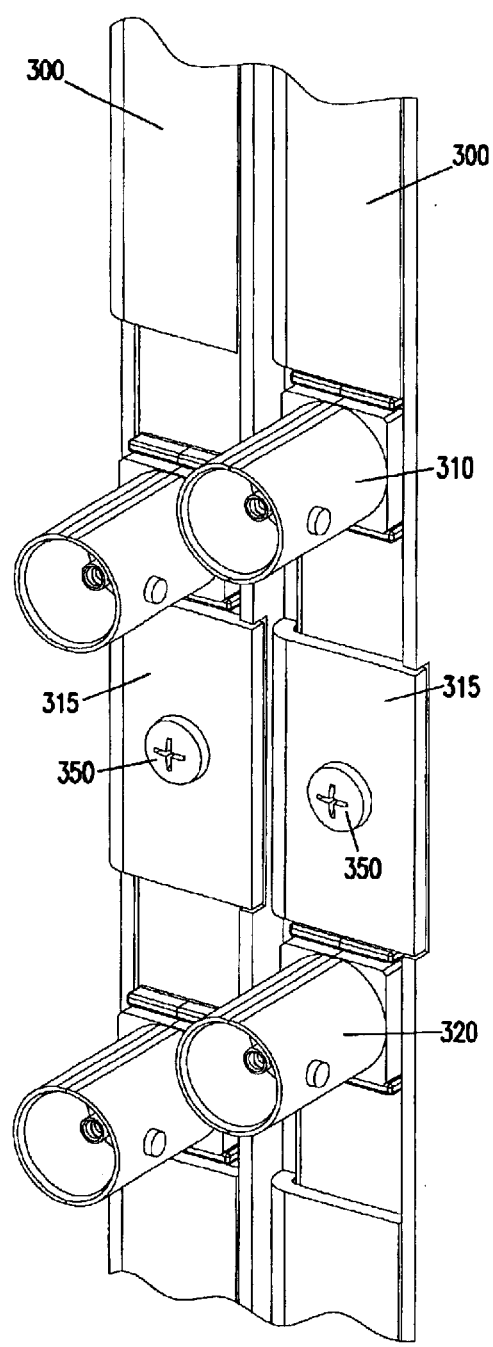

FIG. 14
FIG. 15
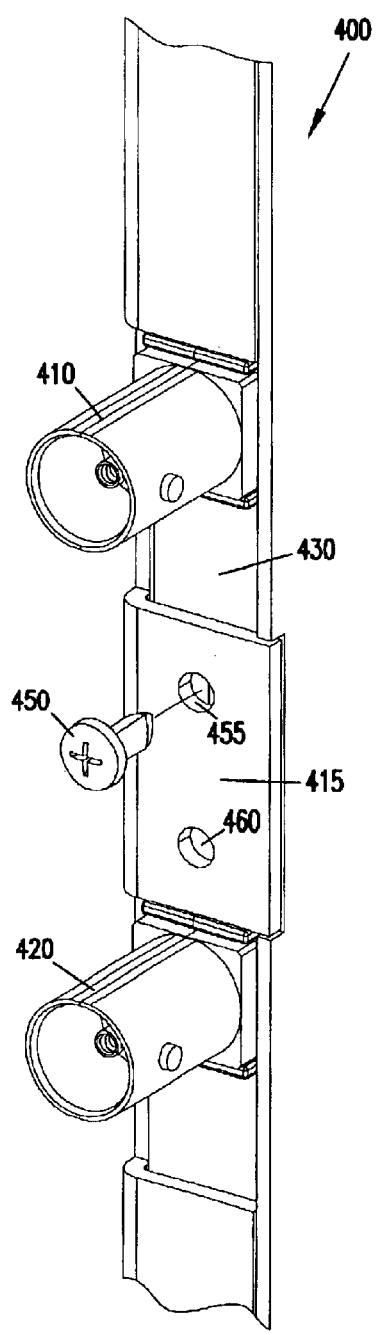
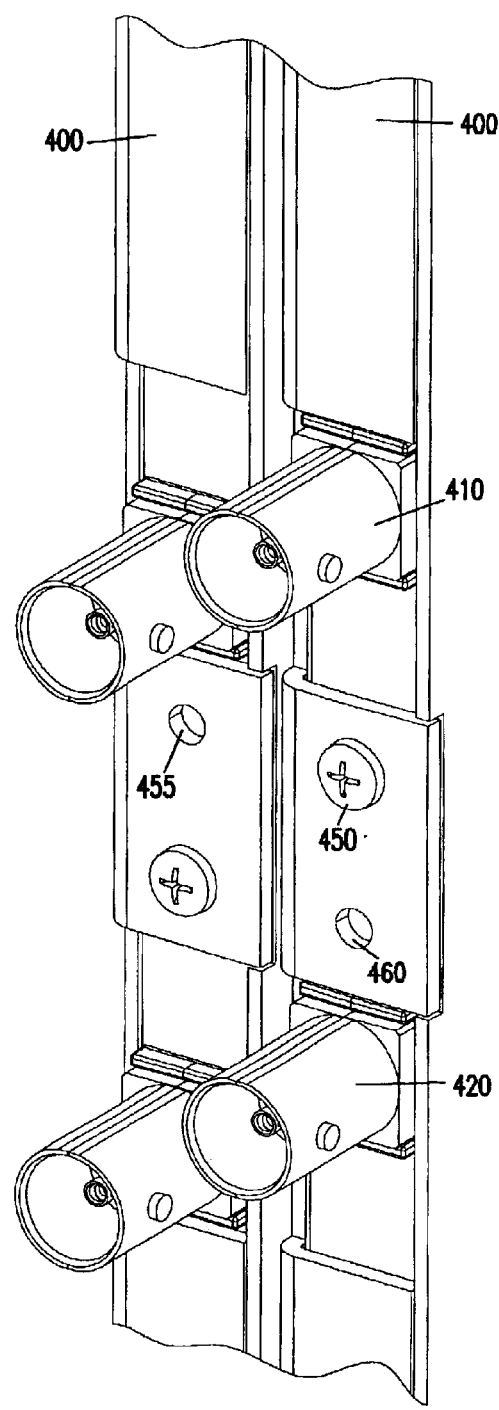

FIG. 16
FIG. 17
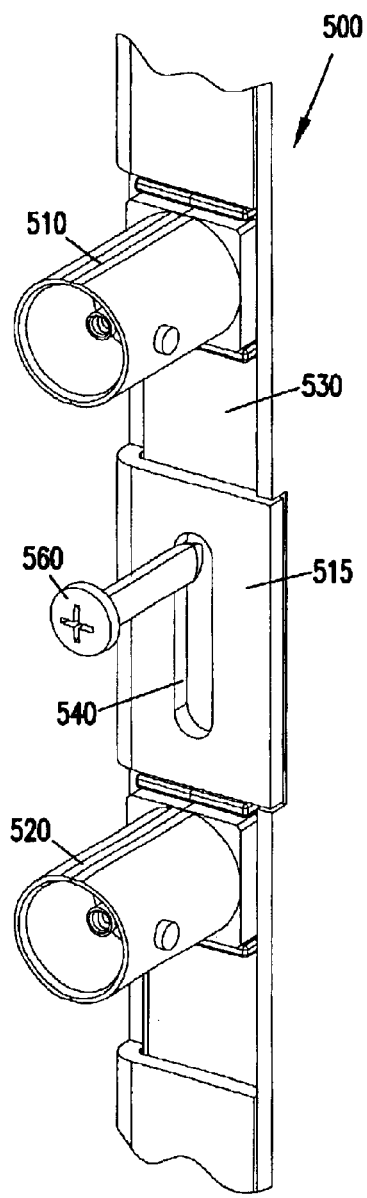
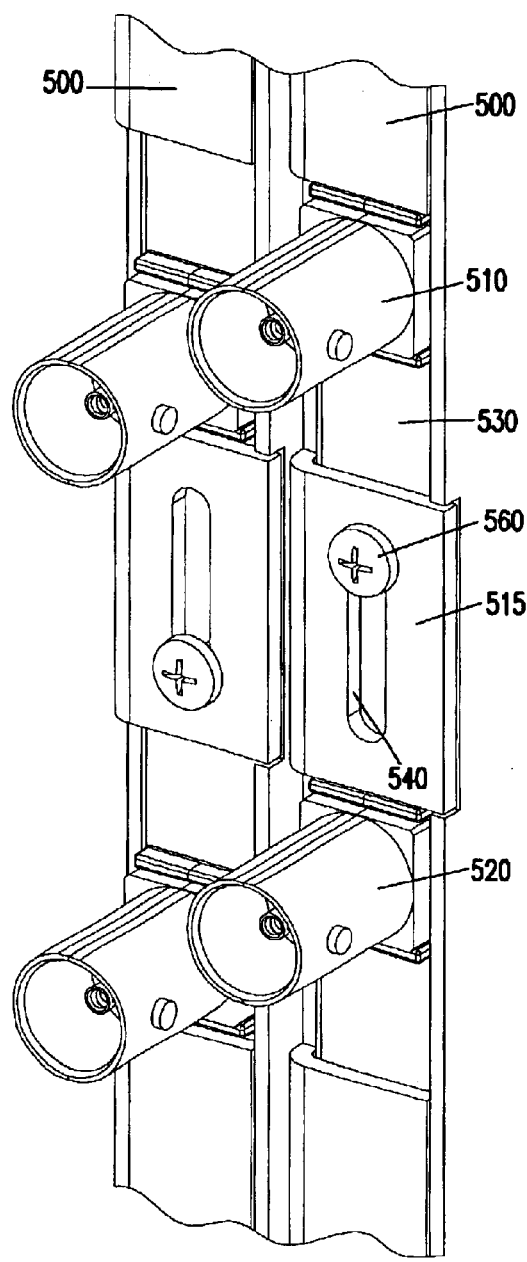

FIG. 18
FIG. 19
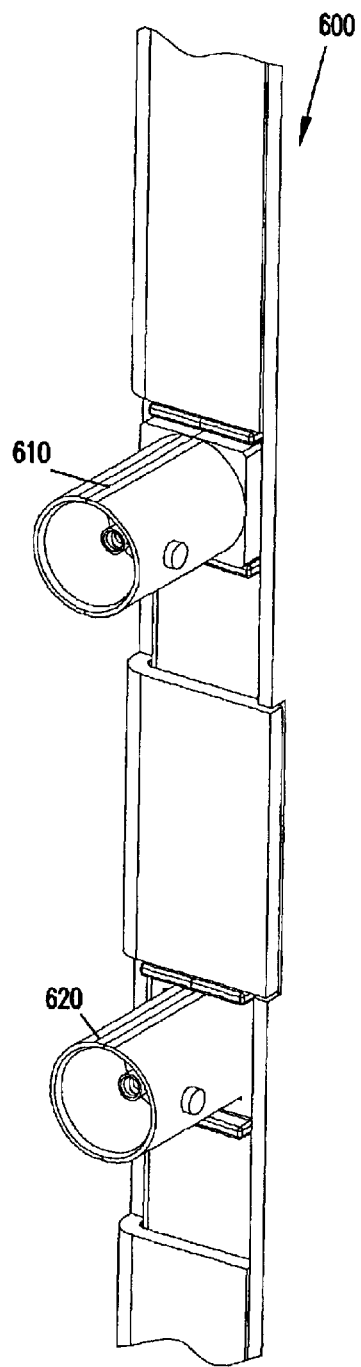
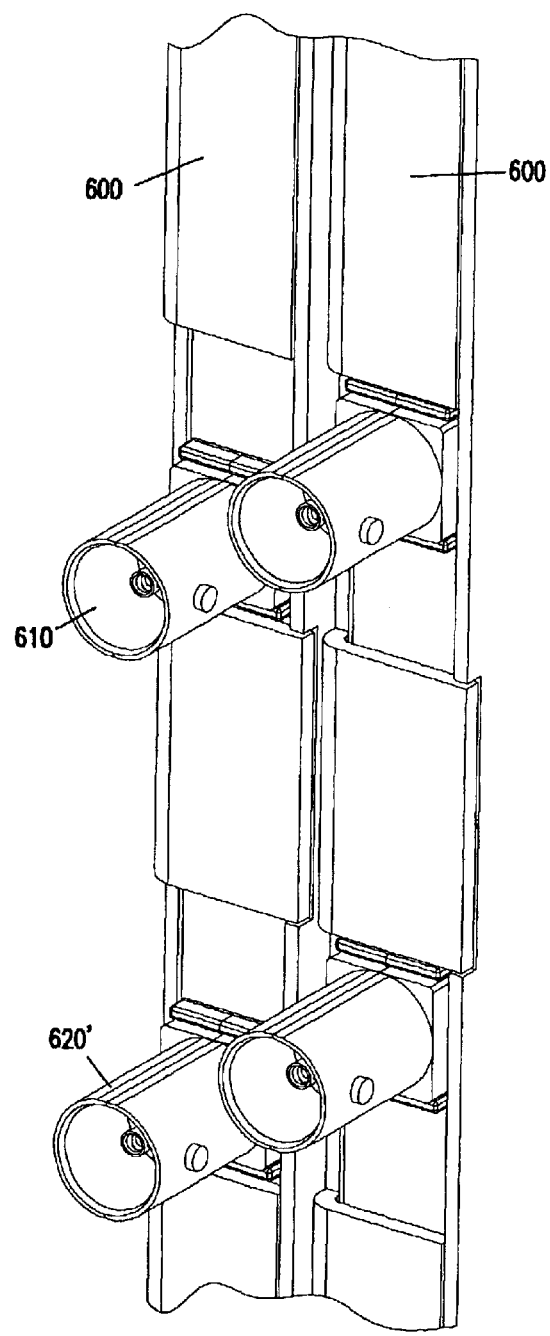

DSX JACK INCLUDING SLIDING REAR CONNECTOR

RELATED APPLICAITONS

This application is a continuation of application Ser. No. 09/835,067, filed Apr. 13, 2001, now U.S. Pat. No. 6,533,616, the disclosure of which is hereby incorporated by reference.

FIELD OF THE INVENTION

The present invention relates to telecommunications connectors. More specifically the present invention relates to connectors mounted in jack modules or equipment panels.

BACKGROUND OF THE INVENTION

Telecommunications equipment typically includes large numbers of cables connected to equipment panels or modules mounted in chassis systems. In order to make the most efficient use of available space, equipment panels have increasingly become more densely populated with connectors for securing cables thereto, and cable connector modules have become increasingly smaller to fit more connector locations within one chassis.

One factor which limits the density of connectors in telecommunication equipment is the outside dimension of mating connectors on the ends of the cables which must be connected to the connectors in equipment panels or modules. If the connectors in the panel or module are spaced too closely together, it becomes difficult to fit the mating connectors side-by-side over the panel connectors. To avoid this problem, prior systems have employed staggered connector panels or have designed two different connector modules with different arrangements of the connectors so that when the two different modules are placed next to each other in an alternating arrangement, a staggered pattern of connectors is achieved. This method, however, requires the manufacturer to make two different modules, and requires the user to purchase two different modules. There is a need for a simple, efficient means to densely populate connector panels or modules with connectors, yet still allow sufficient space for accessing the connector during cable installation and for receiving densely spaced mating connectors.

SUMMARY OF THE INVENTION

One aspect of the present invention relates to a connector assembly having a planar surface which defines a connector window lying in a first plane. The assembly includes a connector received in the connector window. The connector is slidable between first and second positions within the connector window parallel to the first plane.

Another aspect of the present invention relates to a carriage which receives the connector. The carriage is slidable with the connector between first and second positions relative to the connector housing. The carriage may include means for retaining the carriage in a selected position. The means for retaining the carriage may include depressible tabs or other elements having edges to oppose the connector housing. The carriage may also include guiderails to be received in guide-slots of the connector housing to guide the carriage between first and second positions.

Another aspect of the present invention relates to a carriage assembly including two opposed carriage members defining recesses. The carriage members include means for joining the carriage members in a mating arrangement, thereby trapping a plurality of connectors between the carriage members in the recesses. The connectors may include collars for preventing axial movement of the connectors relative to the carriage. The carriage may also include a depressible tab.

An additional aspect of the present invention relates to a connector assembly having first and second opposed panels. The first opposed panel includes a plurality of ports, and the second panel includes a plurality of slidable connectors which are electrically connected to the ports. The ports may include cross-connect ports, monitoring ports, and access ports. The circuit connecting the ports and the connectors may be a switching circuit.

A further aspect of the present invention relates to a method for arranging a plurality of connectors into a staggered arrangement including the steps of placing two connector housings having slidable connectors adjacent one another, and sliding one connector into a different position. The connector could be slid before the modules are placed adjacent each other.

BRIEF DESCRIPTION OF THE DRAWINGS

FIG. 5 is a rear perspective view of a jack module with sliding rear connectors according to the present invention.

FIG. 6 is a first front perspective view of the module of FIG. 5.

FIG. 7 is a second front perspective view of the module of FIG. 5.

FIG. 8 is front perspective view of a connector carriage assembly according to the present invention.

FIG. 10 is a partial perspective view of a first alternative embodiment of a connector assembly according to the present invention.

FIG. 11 is a partial perspective view of two adjacent connector assemblies according to the embodiment of FIG. 11.

FIG. 12 is a partial perspective view of a second alternative embodiment of a connector assembly according to the present invention.

FIG. 13 is a partial perspective view of two adjacent connector assemblies according to the embodiment of FIG. 12.

FIG. 14 is a partial perspective view of a third alternative embodiment of a connector assembly according to the present invention.

FIG. 15 is a partial perspective view of two adjacent connector assemblies according to the embodiment of FIG. 14.

FIG. 16 is a partial perspective view of a fourth alternative embodiment of a connector assembly according to the present invention.

FIG. 17 is a partial perspective view of two adjacent connector assemblies according to the embodiment of FIG. 16.

FIG. 18 is a partial perspective view of a fifth alternative embodiment of a connector assembly according to the present invention.

FIG. 19 is a partial perspective view of two adjacent connector assemblies according to the embodiment of FIG. 18.

DETAILED DESCRIPTION

The present invention relates to jack modules or other telecommunications equipment which include connectors which may be selectively positioned between at least first and second positions by sliding the connectors within a connector housing. Referring now to FIGS. 1–4, a set 10 of four jack modules 100 are shown. The modules 100 would typically be mounted by fasteners 20 at flanges 22 to a panel, chassis or rack system side-by-side as shown. Modules 100 are configured so as to increase the density of cable jacks that can be achieved in any given amount of space. In order to achieve a high density of jacks, the connectors at the rear of the jack modules are arranged in a staggered pattern. This allows sufficient room for connectors on the ends of cables to fit around the connectors of the modules without blocking adjacent connectors. Although the preferred embodiment described herein incorporates the present invention into a switching jack module, it is to be understood that the sliding connectors of the present invention could be used on a variety of other telecommunications equipment surfaces having connectors mounted therein.

Figure 1:
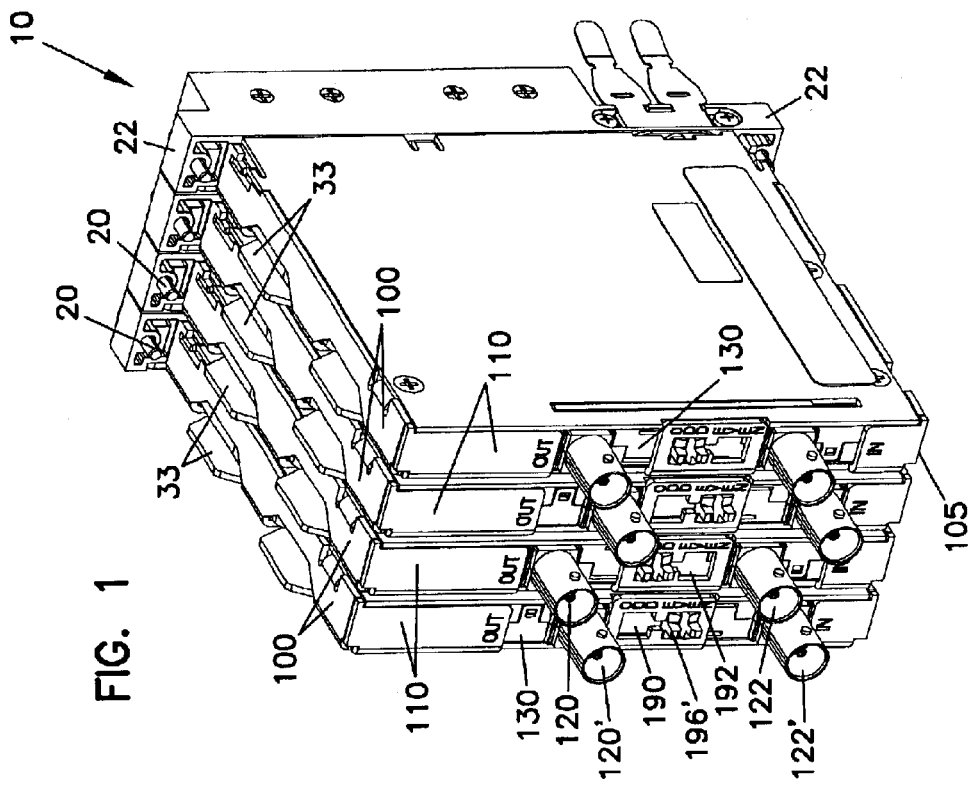
FIG. 1 is a rear perspective view of four jack modules with sliding rear connectors according to the present invention.
Figure 2:
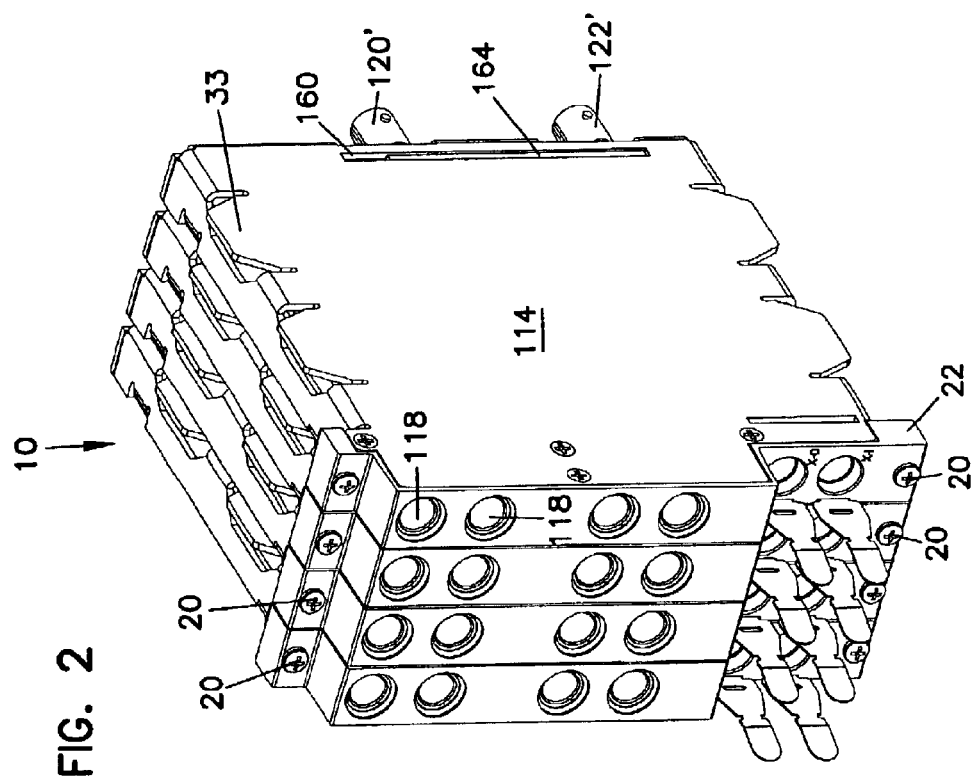
FIG. 2 is a front perspective view of the modules of FIG. 1.
Figure 4:
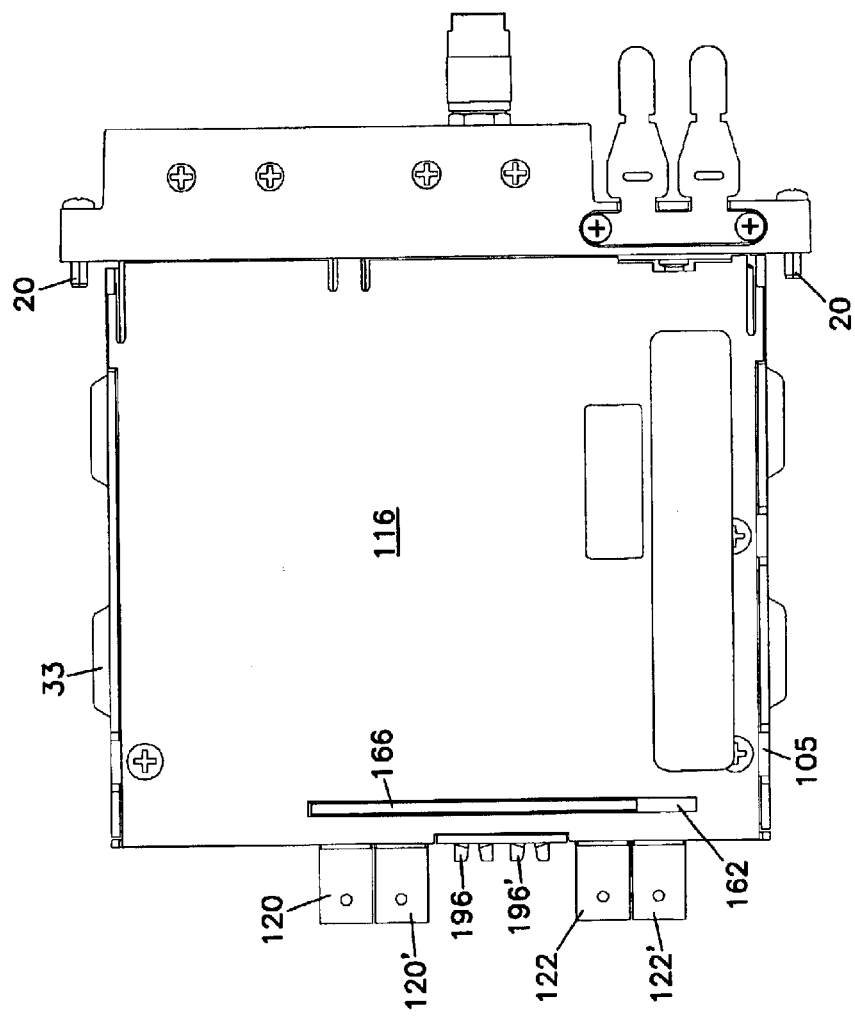
FIG. 4 is a side view of the modules of FIG. 1.
Figure 3:
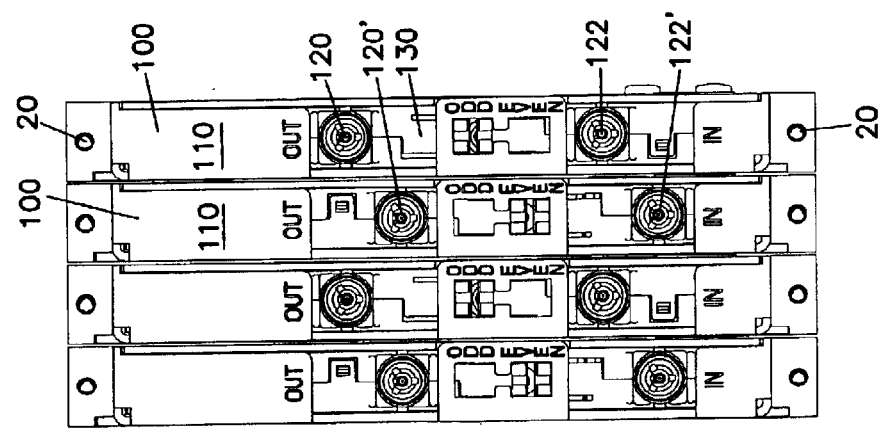
FIG. 3 is a rear view of the modules of FIG. 1.

Each module 100 includes a connector housing 105 having a rear surface 110. Module 100 includes two connectors 120 and 122. Connectors 120 and 122 are received in carriage 130. Connectors 120 and 122 along with carriage 130 slide within the connector housing 105 between first and second positions. Connectors 120 and 122 are shown in first positions. Connectors 120' and 122' are shown in second positions. By alternating the positions of adjacent connectors a staggered pattern can be achieved as shown in FIGS. 1 and 3.

Referring now to FIGS. 5–7, a single jack module 100 is shown incorporating sliding connectors 120 and 122. Connectors 120 and 122 are BNC style connectors in the illustrated embodiment. The module 100 includes a housing having a rear surface 110, a front surface 112, top and bottom surfaces 113 and 115, and two side surfaces 114 and 116 which define a module interior. The modules may include edgewise extensions 33 along the top for assisting insertion of the modules into a chassis or panel. The rear surface defines connector windows 150 and 152. Connectors 120 and 122 are received in the connector windows 150 and 152. The front surface 112 may define a plurality of connectors such as ports 118 which are electrically connected to connectors 120 and 122 by an electric circuit within the module interior. The ports 118 may include monitor ports 118a and 118b, cross-connect ports 118c, and access ports 118d and 188e (IN and OUT ports). A plug 119 commonly used for connecting a cable to the access ports 118 is shown in port 118e in FIGS. 6 and 7.

Figure 6A:
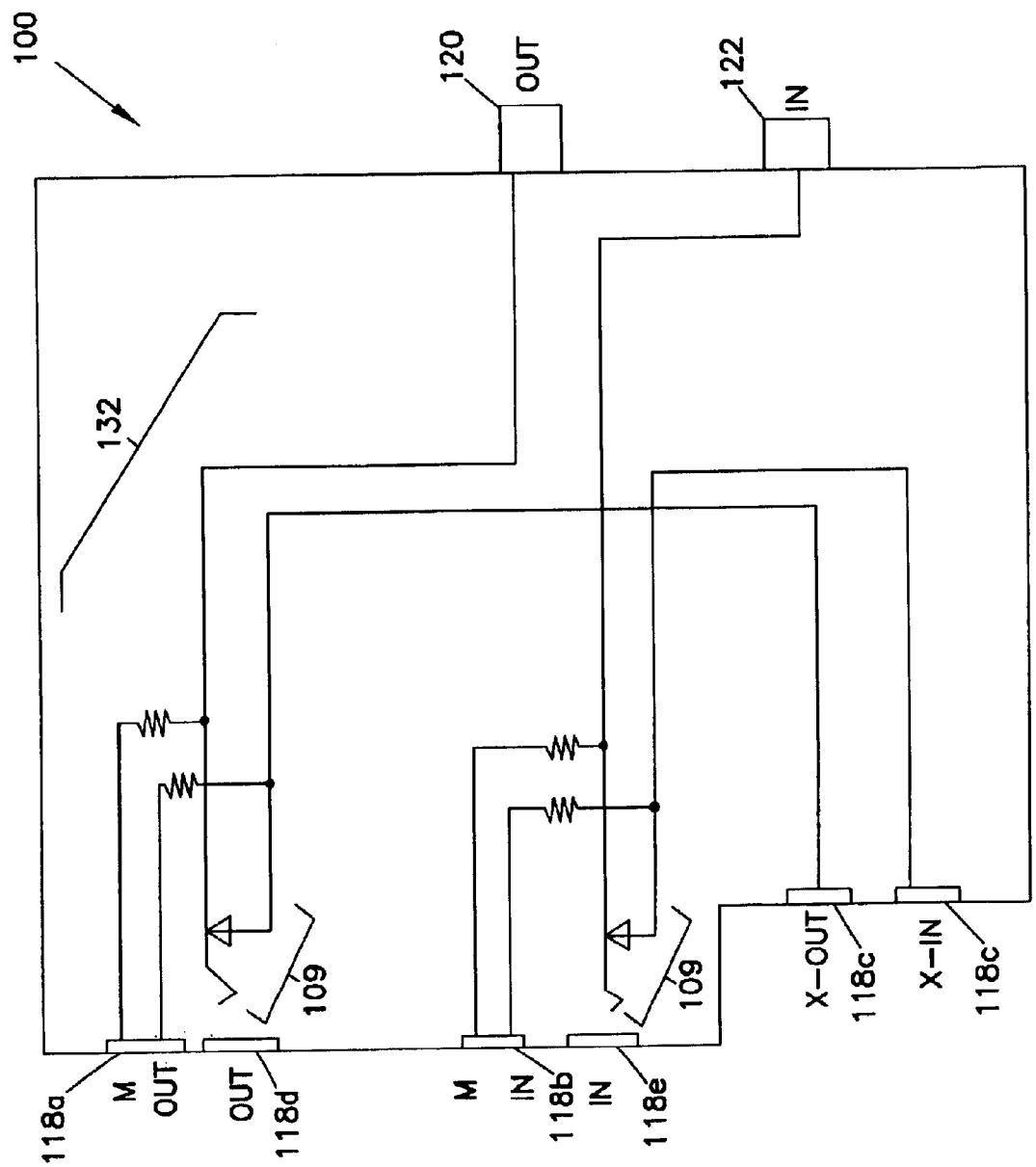
FIG. 6A is a schematic diagram of an electrical circuit of a switching jack.

FIG. 6A shows a schematic diagram of the electrical circuit 132 of switching jack module 100. In a digital signal cross-connect (dsx) module, typically the rear connectors 120 and 122 are connected to cables leading to remote equipment. The connectors 120 and 122 are electrically connected to cross-connect ports 118c. The cross-connect ports 118c are connected by jumper cables to cross-connect ports of another cross-connect module. The access ports 118d and 118e may be periodically used to interrupt the signal passing between the cross-connect ports 118c and the connectors 120 and 122 and to switch (via switches 109) the signals to pass through cables inserted into the access ports 118d and 118e. The monitor ports 118a and 118b may be used to monitor the signals passing through the module. The preferred embodiment shown in the figures incorporates BNC connectors 120 and 122. It is to be understood that the present invention may incorporate many other types of connectors, for example TNC, 1.6/5.6, Type 43, twisted pair connectors including DB style, or ribbon styles, or other cable connectors such as fiber optic connectors. The present invention may be employed to slidably mount many types of connectors such as ports 118. The ports may be slidably mounted to a panel or chassis system with or without additional connectors on an opposing surface or panel.

Side surfaces 114 and 116 both define guide-slots 160 and 162. The guide-slots are characterized by a length which lies parallel to the direction the connectors 120 and 122 slide when transitioning between the first position and the second position.

Figure 9:
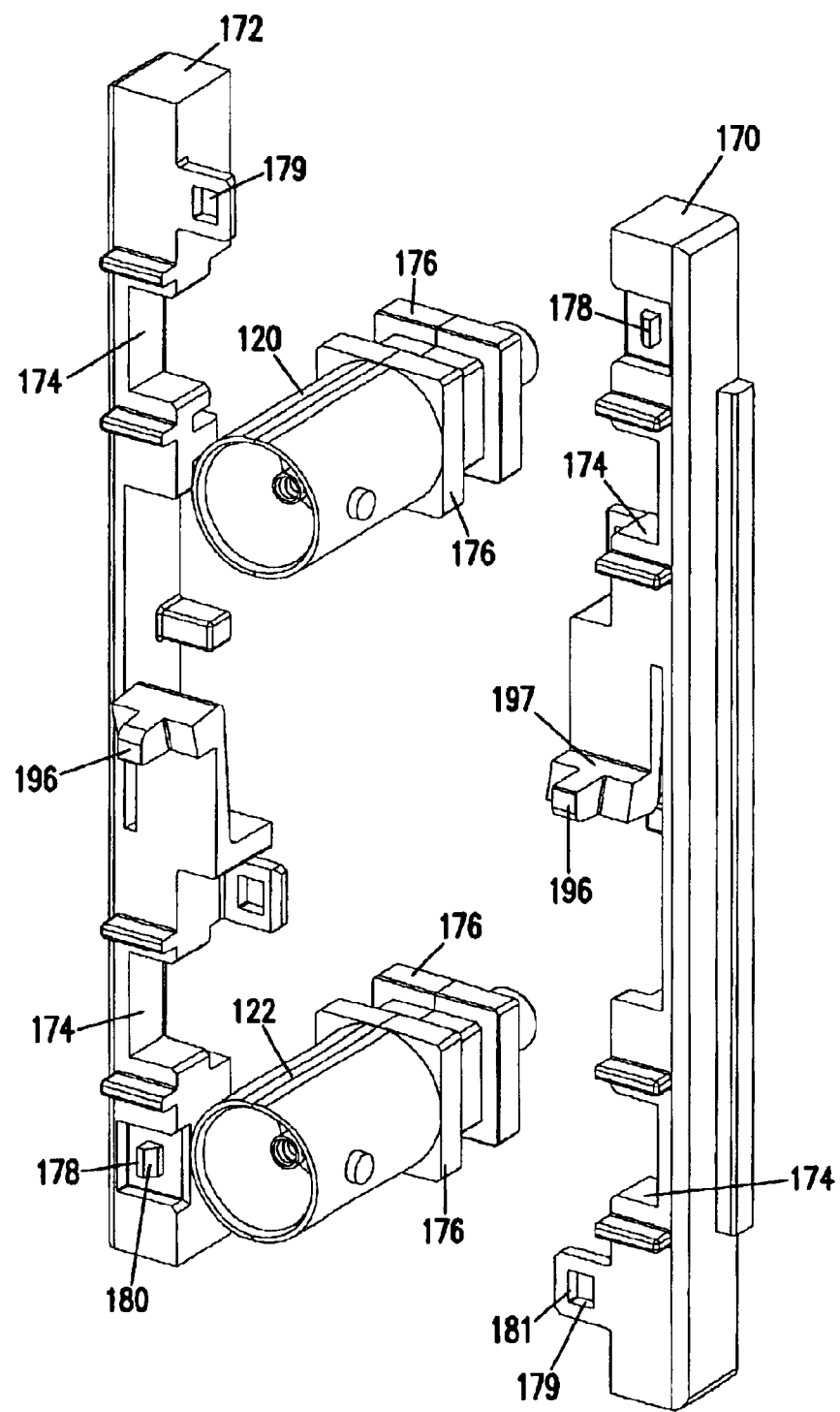
FIG. 9 is an exploded view of the connector carriage assembly of FIG. 8.

Referring now to FIGS. 8 and 9, a carriage 130 is shown for supporting the connectors 120 and 122. The carriage 130 slides with the connectors 120 and 122 within the connector housing 105. The carriage 130 may include guide members such as guiderails 164 and 166. The guiderails 164 and 166 are received in guide-slots 160 and 162 of the connector housing 105 to retain the carriage 130 within the housing and guide the carriage 130 as it transitions between first and second positions. The carriage 130 and housing 105 could be reconfigured so that the carriage 130 defines the guide-slot which receives a guiderail or other guide member included in the connector housing.

As shown in FIG. 9, in the preferred embodiment the carriage assembly 131 includes a carriage 130 and connectors 120 and 122. The carriage 130 includes first and second carriage members 170 and 172. Carriage members 170 and 172 define recesses 174 for receiving a connector therein. Connectors 120 and 122 are trapped between carriage members 170 and 172 in recesses 174. Connectors 120 and 122 may include collars 176 spaced apart along the connectors. The recessed portion of carriage members 170 and 172 may then be received between the connector collars 176 to prevent the connectors from being axially removed from the carriage 130.

Carriage members 170 and 172 include posts 178 and eyes 179. Posts 178 have a ramped surface 180. Eyes 179 have a retaining edge 181. Posts 178 are received by eyes 179 so that the retaining edge 181 retains the carriage members 170 and 172 in a mating arrangement trapping the connectors 120 and 122 between them. Carriage 130 may be made of plastic. As can be seen in the FIG. 9, carriage member 170 is configured so that an identically shaped carriage member when rotated 180 degrees can be coupled to carriage member 170 in a mating arrangement. Carriage member 172, is actually identical to carriage member 170, only carriage member 172 is turned 180 degrees to be in a mating position relative to carriage member 170. By configuring the carriage members in this way, both carriage members 170 and 172 may be formed in the same mold, reducing the number of different parts used in the assembly.

Alternatively, snaps, tabs, slots, inserts, tabs or other engaging edges could be used to secure carriage members 170 and 172 in a mating arrangement. Also, the carriage could be a single molded piece instead of two, for example the carriage could be injection molded around a connector. Carriage 130 in the figures receives two connectors 120 and 122, but alternative embodiments could include single connector carriages receiving only one connector which would allow each individual connector to be positioned independently of other connectors. The carriage 130 could be configured to receive more than two connectors. The connector housing could also be configured with a larger connector window or multiple connector windows to allow the carriage and connectors to be positioned in more than two positions. For example, a three-position system could include an intermediate position, an upper position, and a lower position.

Referring now to FIG. 5, the connector housing 105 defines first and second apertures 190 and 192 connected by a channel 194. Carriage 130 includes a protruding tab 196 received in the first aperture 190. The protruding tab extends from a flexible lever 191. The protruding tab 196 includes edges 197 and 199 which retain the carriage 130 and the connectors 120 and 122 in the first position by opposing edges of the apertures of the connector housing 105. The protruding tab 196 is depressible so that when depressed, the carriage 130 and connectors 120 and 122 may slide to the second position (shown in FIGS. 1 and 3). In the second position, protruding tab 196' is received in the second aperture 192 thereby retaining the carriage 130 and connectors in the second position.

Alternatively, the assembly may not include a means for retaining the carriage and connectors in the selected position. Instead, the present invention could be used during installation to slide the connectors from an initial position into a more accessible position in order to connect or disconnect a cable to or from the connector. Then the connector could be allowed to slide back down into its original position.

The carriage and connector housing could be configured with various opposing edges in order to retain the carriage and connectors in a selected position. These could include engaging tabs and slots, push-and-slide, or pull-and-slide mechanisms. FIGS. 10–19 show examples of alternatives for achieving this.

FIG. 10 shows a connector assembly 200 including a carriage 230 with a single protruding tab 235 which can be transitioned between first and second apertures 238 and 240 in connector housing 215 by either depressing or pulling tab 235 from aperture 238 and sliding the carriage 230 with the connectors 210 and 220. FIG. 11 shows two modules according to the embodiment of FIG. 10 with the connectors arranged in a staggered pattern.

FIG. 12 shows a connector assembly 300 including a carriage 330 with connectors 310 and 320. Connector housing 315 defines a fastener hole 340 which receives a fastener 350. Fastener 350 may be inserted into hole 340 to secure the carriage 330 in a selected position, fastener 350 may then be removed to allow carriage and connectors to transition to a different position as shown in FIG. 13.

FIG. 14 shows a connector assembly 400 including a carriage 430 with connectors 410 and 420. Connector housing 415 defines a fastener aperture 455 and 460 for both first and second positions. Carriage 430 may define a mating fastener receptacle which is aligned beneath aperture 455 when the carriage 430 is in a first position and which is aligned beneath aperture 460 when the carriage 430 is in a second position. Fastener 450 may be inserted through connector housing 415 into the fastener receptacle to retain the carriage 430 in a selected position. FIG. 15 show two assemblies according to the embodiment of FIG. 14 in a staggered arrangement.

FIG. 16 shows a connector assembly 500 including a carriage 530 with connectors 510 and 520. Connector housing 515 defines a slot 540. Slot 540 receives fastener 560 which may be tightened to retain carriage 530 and connectors in a selected position or which may be loosened to allow the carriage to slide and transition to a new position. FIG. 17 shows two assemblies according to the embodiment of FIG. 15 in a staggered arrangement.

FIG. 18 shows a connector assembly 600 including a carriage 630 and connectors 610 and 620. In the embodiment of FIG. 18, the connectors themselves act as the depressible element to allow transitions between positions. The connectors when depressed would disengage interior features of the connector housing to allow transitions between positions. Connector 620 is shown depressed indicating that connector 620 may be transitioned to another position. FIG. 19 shows two assemblies according to the embodiment of FIG. 18 in a staggered arrangement.

By using two connector housings that include slidable connectors according to the present invention, a staggered arrangement of connectors can be achieved. The method would include the step of sliding a slidable connector into a position on a first module and placing the first module adjacent a second module with a connector in a different position. Alternatively, the two modules could first be placed next to each other and then one sliding connector would be slid to a staggered position relative to the connector in the second module.

The present invention can be employed in various applications. The invention is not limited to the preferred embodiment disclosed herein. For example, the connector housing may be any panel having a flat surface in which connectors are disposed. Having described the present invention in its preferred embodiment, modifications and equivalents may occur to one skilled in the art. It is intended that such modifications and equivalents shall be included within the scope of the claims which are appended hereto.

What is claimed is:

1. A connector assembly for connecting to a cable, the connector assembly comprising:
    a connector housing including a planar surface, the planar surface defining a retaining aperture and at least one connector window lying in a first plane;
    a connector received in the connector window of the planar surface, the connector being slidably positionable at a first position relative to the retaining aperture and a second position relative to the retaining aperture; and
    a retaining element received within the retaining aperture, the retaining element being configured to retain the connector at either the first position or the second position;
    wherein the connector is slidable parallel to the first plane between the first position and the second position within the connector window;
    wherein the connector is constrained so that it slides only along one direction parallel to the planar surface;
    wherein the connector is constrained from rotation relative to the connector housing in both the first and second positions.

2. The connector assembly of claim 1 further comprising a carriage which receives the connector, the carriage being slidable with the connector between the first position and the second position relative to the connector housing.

3. The connector assembly of claim 2 wherein the retaining aperture is configured to retain the carriage and the connector in a selected one of the first and second positions along the direction of sliding.

4. The connector assembly of claim 2 wherein the carriage includes an edge which opposes an edge of the connector housing to retain the carriage in the first position.

5. The connector assembly of claim 2 wherein the retaining aperture defines a fastener aperture, and the retaining element comprises a fastener received in the fastener aperture, the fastener retaining the carriage in the first position.

6. The connector assembly of claim 2 wherein one of the connector housing and the carriage define at least one guide-slot having a length which is parallel to a direction in which the carriage is slidable, and wherein the other includes at least one guide member received in the guide-slot.

7. The connector assembly of claim 2 wherein the carriage receives a plurality of connectors, each connector being received through a connector window defined by the connector housing, wherein the plurality of connectors are slidable together with the carriage between the first and second positions.

8. The connector assembly of claim 1 wherein the connector is a first connector, and further comprising a second connector, wherein the first and second connectors are connected with a linking member, wherein the first and second connectors slide together relative to the connector housing.

9. The connector assembly of claim 8 wherein the connector housing is a first connector housing, and further comprising a plurality of additional connector housings including first and second connectors, wherein the first connector housing and the additional connector housings are positioned adjacent to one another, wherein the first and second connectors of the first connector housing can be offset relative to the first and second connectors of the additional connector housings.

10. The connector assembly of claim 9 wherein the retaining element is configured to selectively lock the first and second connectors and the linking member in the first and second positions.

11. The connector assembly of claim 1 wherein the connector is a BNC connector.

12. The connector assembly of claim 1 wherein the connector includes a cylindrical portion and two bayonets.

13. The connector assembly of claim 1 wherein the retaining aperture is a first retaining aperture, and further comprising a second retaining aperture formed in the planar surface of the connector housing.

14. The connector assembly of claim 13 wherein the retaining element is a tab selectively positionable in the first and second apertures and configured to slidably position the connector in a selected one of the first and second positions.

15. The connector assembly of claim 14 wherein the tab is interconnected to a carriage configured to receive the connector.

16. The connector assembly of claim 14 wherein the tab is depressible to slidably position the connector in the selected position.

17. The connector assembly of claim 14 further including a channel interconnecting the first and second retaining apertures, the tab being configured to slide through the channel from either one of the first and second apertures to the other aperture.

18. The connector assembly of claim 1 further including a carriage configured to receive the connector, and the retaining element comprising a flexible lever interconnected to the carriage, the flexible lever being configured to slidably position the connector at one of the first and second positions.

19. The connector assembly of claim 1, wherein the planar surface of the connector housing extends between first and second sides, at least one of the first and second side including a slot configured to guide the connector along the one direction.

20. The connector assembly of claim 19, further including a carriage configured to receive the connector, the carriage including a guide rail configured for receipt within the slot of the connector housing.

21. A connector assembly for connecting to a cable, the connector assembly comprising:

a connector housing including a retaining structure and a planar surface, the retaining structure including first and second apertures formed in the planar surface, the planar surface defining at least one connector window lying in a first plane;

a connector received in the connector window of the planar surface, the connector being slidably positionable at a first position relative to the retaining structure and a second position relative to the retaining structure; and a tab selectively positionable in the first and second apertures of the retaining structure, the tab being configured to slidably position the connector in a selected one of the first and second positions;

wherein the connector is slidable parallel to the first plane between the first position and the second position within the connector window;

wherein the connector is constrained so that it slides only along one direction parallel to the planar surface;

wherein the connector is constrained from rotation relative to the connector housing in both the first and second positions.

22. The connector assembly of claim 21 wherein the tab is interconnected to a carriage configured to receive the connector.

23. The connector assembly of claim 21 wherein the tab is depressible to slidably position the connector in the selected position.

24. The connector assembly of claim 21 wherein the retaining structure further includes a channel interconnecting the first and second apertures, the tab being configured to slide through the channel from either one of the first and second apertures to the other aperture.

25. A connector assembly for connecting to a cable, the connector assembly comprising:

a connector housing including a retaining structure and a planar surface, the planar surface defining at least one connector window lying in a first plane;

a connector received in the connector window of the planar surface, the connector being slidably positionable at a first position relative to the retaining structure and a second position relative to the retaining structure; and a carriage configured to receive the connector, the carriage including a flexible lever for slidably positioning the connector at one of the first and second positions;

wherein the connector is slidable parallel to the first plane between the first position and the second position within the connector window;

wherein the connector is constrained so that it slides only along one direction parallel to the planar surface;

wherein the connector is constrained from rotation relative to the connector housing in both the first and second positions.

* * * * *